United States Patent
Horslund et al.

[11] Patent Number: 5,983,160
[45] Date of Patent: Nov. 9, 1999

[54] INCREASE JAMMING IMMUNITY BY OPTIMIZING PROCESSING GAIN FOR GPS/INS SYSTEMS

[75] Inventors: Jeff M. Horslund, Grapevine; Jonathan R. Hooker, Dallas, both of Tex.

[73] Assignee: Raytheon Company, Lexington, Mass.

[21] Appl. No.: 09/022,023

[22] Filed: Feb. 11, 1998

Related U.S. Application Data

[60] Provisional application No. 60/044,513, Apr. 21, 1997.

[51] Int. Cl.$^6$ ............... G06G 7/78; G01S 5/02
[52] U.S. Cl. ............ 701/213; 701/214; 701/215; 342/357; 342/457
[58] Field of Search ............... 701/16, 213, 215, 701/216, 219, 220, 214, 217; 342/357, 442, 26, 33, 63, 352; 702/153, 190; 73/178 R

[56] References Cited

U.S. PATENT DOCUMENTS

| | | | |
|---|---|---|---|
| 4,653,053 | 3/1987 | Pelchat et al. | 371/43.1 |
| 5,119,103 | 6/1992 | Evans et al. | 342/423 |
| 5,223,843 | 6/1993 | Hutchinson | 701/226 |
| 5,347,284 | 9/1994 | Volpi et al. | 342/356 |
| 5,420,592 | 5/1995 | Johnson | 342/357 |
| 5,576,715 | 11/1996 | Litton et al. | 342/357 |
| 5,594,454 | 1/1997 | Devereux et al. | 342/357 |
| 5,603,079 | 2/1997 | Olds et al. | 455/13.1 |
| 5,654,890 | 8/1997 | Nicosia et al. | 701/16 |
| 5,657,025 | 8/1997 | Ebner et al. | 701/219 |
| 5,774,829 | 6/1998 | Cisneros et al. | 701/214 |
| 5,786,773 | 7/1998 | Murphy | 340/947 |
| 5,893,044 | 4/1999 | King et al. | 701/214 |

FOREIGN PATENT DOCUMENTS

| | | |
|---|---|---|
| 0526040A2 | 2/1993 | European Pat. Off. |
| 0763749A1 | 3/1997 | European Pat. Off. |

*Primary Examiner*—Jacques H. Louis-Jacques
*Attorney, Agent, or Firm*—Baker & Botts, L.L.P.

[57] ABSTRACT

A system and method for increasing jamming immunity in a GPS/INS system. The system includes a signal processor for receiving and down-converting GPS signals to a baseband frequency to provide I and Q (sine and cosine) signals. An integrate and dump operation is performed on the I and Q signals to provide GPS range and range rate residuals which are uncorrelated from sample to sample. A Kalman filter estimates navigation state corrections from the GPS range and range rate residuals. A NAV function, responsive to the output of the Kalman filter and range error and velocity error signals, provides guidance information and signals for correcting at least one of earth centered earth fixed (ECEF) position, velocity, initial attitude and IMU alignment states which are dynamically calculated from the range and range rate measurements. A line of sight geometry function maps position and velocity vector information from the NAV function into geometric range and range rate scalar information and feeds the scalar information to the signal processor and circuitry to perform an integrate and dump operation.

36 Claims, 1 Drawing Sheet

INCREASE JAMMING IMMUNITY BY OPTIMIZING PROCESSING GAIN FOR GPS/INS SYSTEMS

CROSS REFERENCE TO RELATED APPLICATIONS

This application claims priority under 35 USC §119 of provisional application Ser. No. 60/044,513, filed Apr. 21, 1997.

BACKGROUND OF THE INVENTION

1. Field of the Invention

This invention relates to a method and system for improving immunity to jamming in systems utilizing the global positioning system (GPS).

2. Brief Description of the Prior Art

Operations utilizing signals received from the GPS have been universally utilized both in conjunction with commercial and military applications. GPS and inertial measurement units (IMUs) have been combined or coupled together in the prior art to provide more effective navigation with the GPS correcting the IMU. This combination provides a synergistic result in that the effective bandwidth of the system can be reduced in an optimum fashion to provide improved tracking.

A problem with the use of the GPS is that it can easily be jammed. Systems have been devised in the prior art to minimize the detrimental effects of GPS jamming. However, jamming and the possibility of jamming continue and still can present navigation and other problems. Accordingly, systems which provide increased immunity against such jamming are highly desirable and, in fact, necessary in many applications. It follows that any improvement in immunity against jamming by further reduction in bandwidth is highly desirable.

Traditional GPS receivers contain intermediate tracking loops which operate well at high carrier to noise density (C/NO) (>23 dB-Hz) but break down at low C/NO conditions. Delay lock loops (DLLs) are used for tracking code phase and phase lock loops (Costas loops) are used to track carrier phase. The outputs for each loop type are used to generate pseudo range and delta ($\Delta$) range measurements respectively, which are used by a Kalman filter in formation of range and delta ($\Delta$) range residuals (error signals input to the Kalman filter). The noise bandwidths for these loops are usually on the order of 0.025 and 1 Hz for the DLL and Costas loops respectively.

The following list enumerates the problems associated with the traditional solutions to the jamming problem:

1. Under jamming conditions (with low C/NO), narrow tracking loop bandwidths are usually employed, resulting in temporally correlated noise which is a suboptimal solution when viewed from the point of view of the Kalman filter. These narrow bandwidths also produce a correlation effect between measurements and process noise which tends to have destabilizing effects on system performance.

2. As jamming increases, the carrier tracking loop breaks down somewhere in the C/NO neighborhood of 18 dB-Hz. The fundamental reason for the loop break downs is that the signal to noise ratio (SNR) into the (Costas) loop, which is the product of carrier power/noise density (C/NO) and the coherent integration time ((C/NO)·$T_i$= SNR which is the signal to noise ratio prior to the squaring operation). When this happens, the information loss through traditional non-linear loop error discriminants, the arctan function being an example, becomes prohibitive, resulting in virtually no restoring force to any loop perturbation. The only way to recover signal to noise ratio (SNR) is to integrate longer and use narrow bandwidths, resulting in correlated measurement problems described in (1.) above. The loss of carrier loop measurements is key since these measurements provide the most accurate source of information necessary to maintain the INS system alignment (i.e., system errors small).

3. Traditional schemes that employ intermediate tracking loops are somewhat sluggish to reacquire (and acquire) the GPS signals following a jamout period. This is because a certain amount of time must be allocated for the tracking loops to pull in to lock. This time is somewhat large for narrow tracking loop bandwidths which use long time constants.

Intermediate tracking loops employ fixed gains which do not "adapt" to time varying signal conditions (e.g., jamming or loss of data to be used for data wipe off (DWO)). Data wipe off is a method used to improve signal to noise ratio. Since I and Q data input to the baseband algorithm is bi-phase shift keyed (BPSK) modulated at a 50 Hz rate, the signal polarity can therefore change at a 50 Hz rate (e.g. Q=±A sin $\Theta$). Clearly, when this happens, coherently adding I or Q signal samples over time can result in signal cancellation. DWO is a technique which uses a priori estimates of the 50 Hz data stream to remove this effect, thus allowing coherent integration and its benefits. DWO is normally accomplished by demodulation of the data prior to jamout and then storing of the data for later use. This demodulation must take place for the primary purpose of navigation, so the availability of most of the required data is a given. When this happens, the tracking loops are in a state of random walk with a divergence rate determined by the fixed gains employed. This creates measurement, editing and recovery problems when the signal conditions again become favorable. This creates a very suboptimal situation in which data used for DWO is misestimated.

The standard performance metrics when discussing GPS operation under jamming conditions are receiver threshold jamming to signal levels (J/S) and carrier to noise density (C/NO). Under conditions of wideband jamming, C/NO (dB-Hz)=73−J/S (dB). Therefore, under conditions of high J/S, the signal to noise ratio (SNR) decreases proportionally for signals delivered to baseband signal processing algorithms (intermediate baseband tracking loops).

An approach to reducing tracking loop noise bandwidth in order to navigate during modest amounts of jamming is inertial measurement unit (IMU) inertial aiding techniques of code and carrier tracking loops. Assuming that a nulling antenna is not used, tracking loops currently phase lock and code lock to J/S levels of approximately 55 dB and 60 dB respectively. The outputs of these loops produce range and delta ($\Delta$) range measurements to a Kalman filter (KF), generally an 18 state navigation Kalman filter though it should be understood that the number of states of the Kalman filter is optional. Above these jamming levels, complete loss of GPS measurements occurs, resulting in the inertial navigation system drifting in a divergent fashion.

SUMMARY OF THE INVENTION

In accordance with the present invention, a procedure is provided which uses integrate and dump techniques operating on I and Q data to directly produce residuals which are input to a Kalman filter used to correct navigation errors without the use of intermediate tracking loops. The techniques described provide optimal processing gain while retaining the Kalman filter optimality requirements of uncorrelated measurement errors. This technique provides both code and carrier measurement at jamming levels heretofore unheard of. Quality carrier measurement at J/S levels of 70 and 75 dB are attained for carrier phase and frequency measurements respectively, given a joint standoff weapon (JSOW) quality IMU, which uses a low grade (3 sigma) ring laser gyro. Code tracking through the Kalman filter is also attained in the neighborhood of 75 dB J/S. The high quality carrier measurement obtained at these extreme jamming levels is an important feature of the present invention. The accuracy of the measurement maintains the inertial navigation system (INS) alignment by keeping navigation errors small, particularly velocity and attitude errors. Furthermore, these techniques produce jamming immunity without the use of, but not precluding, a nulling antenna. This invention therefore offers a solution to the jamming problem. In summary, in accordance with the present invention, carrier and code tracking is possible (assuming DWO) with 15 dB more jamming than the current state of the art. Without the use of DWO, a 6 dB improvement is to be expected.

Briefly, appropriate coherent and non-coherent integration of I and Q data to minimize nonlinear processing losses which is optionally combined with bi-phase shift keyed (BPSK) data cancellation techniques known as data wipe off (DWO) produces residuals which directly drive the navigation filter. The following discussion describes the processing for three different types of residuals, all of which input I and Q data at a relatively fast rate.

GPS signals are received and down-converted to a baseband frequency and are input to a signal processing chip (SPC) in standard manner. The SPC contains a plurality of GPS channels to enable tracking of a plurality of satellites simultaneously. Accordingly, signals from plural satellites are received and processed in the SPC in parallel to deliver standard samples of I and Q signals (sines and cosines) derived from the GPS system signals down converted to the baseband software.

In the prior art, intermediate tracking loops utilizing I & Q signals received from the SPC were used to track range and Δ range (range rate) to each satellite in order to calculate a residual (error signal that drives the Kalman Filter). This residual is sent to a Kalman filter (KF) which then sends correction data to a generic navigation (NAV) function. A strap down NAV function is preferred, but is optional. Based upon the signals received from the IMU and the KF, the navigation function corrects earth centered earth fixed (ECEF), position and velocity as well as initial attitude and IMU alignment states which are dynamically calculated from range and range rate measurements. The NAV function is standard known software capable of blending raw IMU data with navigation corrections derived from GPS measurements to produce a corrected navigation solution at very fast update rates. These NAV update rates are generally much faster than the GPS measurement rate, but the only requirement is that the updates occur at least as fast as the measurement rate of occurrence. The NAV function then feeds back an estimate of the range and range rate to each satellite through a line of sight (LOS) geometry function to the tracking loops which then tracks out the aiding errors. The LOS geometry function maps navigation position and velocity (vector) information into geometric range and range rate (scalar) information for a given user and each satellite tracked. These estimates are input to the SPC and I & D blocks, based on the system's navigation solution, as range and range rate for each satellite tracked. These estimates are used in a standard manner to produce (or measure) the input I & Q values which are input, for example, at a 200 Hz rate. The aiding errors are the errors in the said range and range rate estimates described above. The Kalman filter, by making corrections to all of the navigation states (position, velocity, attitude, etc.), consequently also reduces the aiding errors to zero (i.e., producing residuals which are on the average zero), thus stabilizing the system.

By the present invention, the intermediate tracking loops are replaced by an integrate and dump (I & D) operation which places the residuals directly into the Kalman filter. By this method, each measurement is independent from sample to sample and loop closure is accomplished by the Kalman filter (and navigation (NAV) function) as opposed to the tracking loops which are themselves closed loop systems. This procedure takes advantage of certain mathematical/statistical properties of the residual estimates used to enhance SNR and thus provides a more stable system at higher jamming levels.

The techniques described provide optimal processing gain while retaining the Kalman filter optimality requirements of uncorrelated measurement errors. Each integrate and dump (I & D) algorithm inputs the I and Q signals from the SPC, which are ninety degrees out of phase with each other, and received at a predetermined rate. These signals are added up coherently (in phase) over a designated time frame (Ti). This time frame is determined as a function of LOS range rate covariance calculated from Kalman filter covariances in order to determine the optimum predetection integration time $T_i$. This functional ($T_i$ is approximately 1/range rate uncertainty) relationship can be implemented as an equation or as a look-up table. The outputs from each coherent summation $\Sigma(\ )$, cross and dot products are formed at the Ti rate and the cross and dot products are then summed over a different time interval of length Tk. This time, Tk, which is chosen to a targeted or desired signal to noise ratio, is determined by SNR estimates computed by the system to provide a pair of second summations or integrals, one for the dot product signal and one for the cross product signal. Then an arctangent (also set forth herein as arctan or atan) function of the summed cross products and dot products [atan2 (cross,dot)] is taken and divided by the integration time (Ti) to obtain the range rate residual directly. This residual is then input to a Kalman filter (KF).

The algorithm which computes range residuals, receives the I and Q signals from the SPC at a predetermined rate. These signals are added up coherently over a designated time frame (Ti) for each of the I and Q signals individually to provide summations or integrals for each of the I and Q signals. Such procedure is provided for both an early channel and a late channel. In each channel, the I signals and Q signals are squared, this being an envelope detect type of operation. The squared signals are summed for the time period Tk.

The algorithm which computes a phase lock loop (PLL) range residual is a biased estimate in contrast to the range residual described above which provides an unbiased estimate of the range to the satellite but is quite noisy. The Kalman filter separates the noise from the signal optimally as long as it is advised of the amount of noise present in the total signal sent thereto. The more noise present, the slower the filter operates. Here, the Kalman filter is used to close a phase lock loop (PLL) by maintaining all of the energy in the I (cosine) channel and providing no energy in the Q (sine) channel or keeping that signal at zero. Although the PLL provides a measurement with two orders of magnitude less noise, a problem with the PLL is that $2\pi$ looks like $4\pi$ which looks like $6\pi$, etc. and has ambiguity. Each $2\pi$ represents a 0.2 meter bias. Accordingly, the system is allowed to converge using the unbiased estimate and then, when the error is low, the PLL mode is used. In accordance with this algorithm, the I and Q signals from the SPC are received at a predetermined rate. These signals are added up coherently over a designated time frame (Ti) for each of the I and Q signals individually to provide summations or integrals for each of the I and Q signals. The arctangents of the summed signals are taken to provide a range residual to the Kalman filter. Although this estimate provides a modulo $2\pi$ bias in range, it provides the most accurate measurement with regard to the estimation of velocity and attitude when compared to the other residual described herein.

DESCRIPTION OF THE PREFERRED EMBODIMENT

Figure 1:
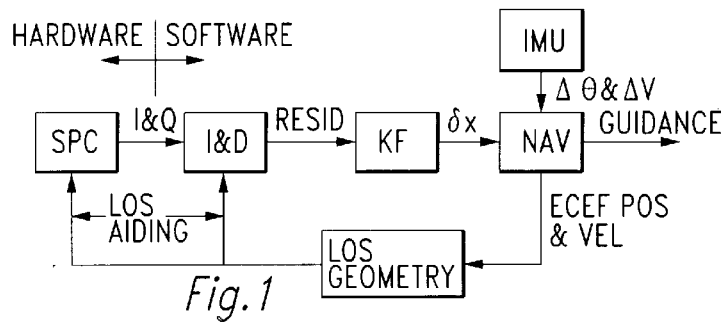
FIG. 1 is a block diagram of an architecture for use in conjunction with the present invention.

Referring to FIG. 1, there is shown a block diagram of an architecture for use in conjunction with the present invention. GPS signals are received and down-converted to a baseband frequency by a standard signal processing chip (SPC) in standard manner. The SPC contains a plurality of GPS channels to enable tracking of a plurality of satellites simultaneously. Accordingly, signals from plural satellites are received and processed in the SPC in parallel to deliver standard I and Q sampled signals (sines and cosines) derived from the GPS system signals to the baseband software.

The intermediate tracking loops of the prior art are replaced by an integrate and dump (I & D) operation which inputs the residuals directly into the KF.

The algorithm uses integrate and dump (I & D) techniques operating on the I & Q data to directly produce residuals input to, for example, an 18 state KF without the use of intermediate tracking loops. The technique described provides optimal processing gain while retaining the KF optimality requirements of uncorrelated measurement errors. This technique provides both code and carrier measurements at jamming levels heretofore not attainable. Quality carrier loop measurement at J/S levels of 70 and 75 are attained for carrier phase and frequency measurements respectively, given a JSOW quality IMU. The high quality carrier measurements at these extreme jamming levels are an important feature of the invention. The accuracy of these measurements maintains the INS system errors small, particularly velocity and attitude errors. Furthermore, these techniques produce jamming immunity without the use of, but not precluding, a nulling antenna.

Figure 2:
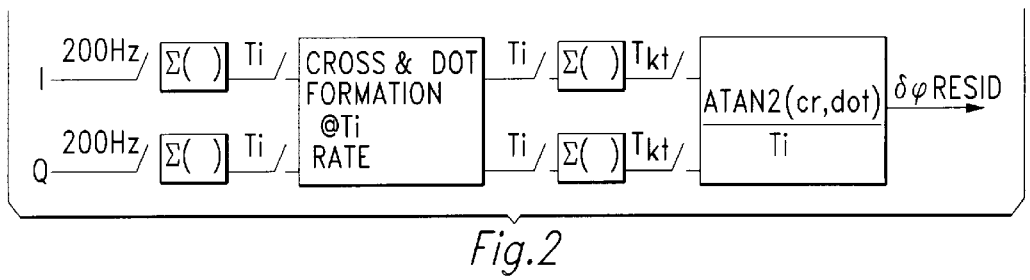
FIG. 2 is a block diagram representing the algorithm for the integrate and dump (I & D) block of FIG. 1 for range rate residual algorithms.

Referring to FIG. 2, there is shown a block diagram representing the algorithm, which is contained in the integrate and dump (I & D) block of FIG. 1 for the range rate residual algorithm. The I and Q signals from the SPC, which ninety degrees out of phase with each other, are received at a predetermined rate, this rate being shown as 200 Hz in the preferred embodiment. These signals are added up coherently (in phase) over a designated time frame (Ti) for each of the I and Q signals individually to provide a summation, (or integral ($\Sigma( )$)) for each of the I and Q signals over the time period Ti. From these summations $\Sigma( )$, cross and dot products are formed at the Ti rate and the cross and dot products are then summed over a different time interval of length Tk to provide a pair of second summations or integrals, one for the cross product signal and one for the dot product signal. Then an arctangent function of the summed cross products and dot products is taken and divided by the integration time (Ti) to obtain the residual directly. This residual is then input to the Kalman filter (KF) in FIG. 1.

Figure 3:
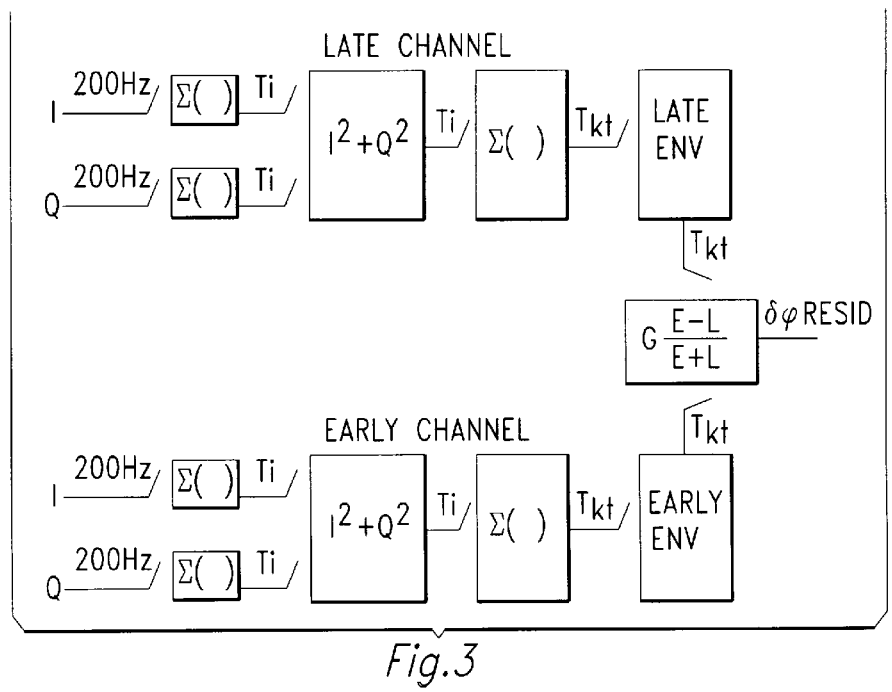
FIG. 3 is a block diagram representing the algorithm for early late range residuals which replaces the I & D block of FIG. 1.

Referring to FIG. 3, there is shown a block diagram representing the algorithm for early late range residuals which represent the I & D block of FIG. 1. This range residual provides a globally stable unbiased estimate of the range to the satellite but is quite noisy (i.e., large standard deviation). In accordance with this algorithm, the I and Q signals from the SPC are received at a predetermined rate, this rate being shown as 200 Hz in the preferred embodiment. These signals are added up coherently over a designated time frame (Ti) for each of the I and Q signals individually to provide summations or integrals for each of the I and Q signals. As can be seen from FIG. 3, such procedure is provided for each of early channel and late channel (separated by ±one half chip). In each of early channel and late channel, the I signals and Q signals are squared, this being an envelope detect type of operation. The squared signals are summed for the time period Ti. Envelope detection then takes place for each channel prior to computation of the range residual which is the difference between early channel and late channel divided by the sum of early channel and late channel, an equation therefore being shown herein below.

Figure 4:
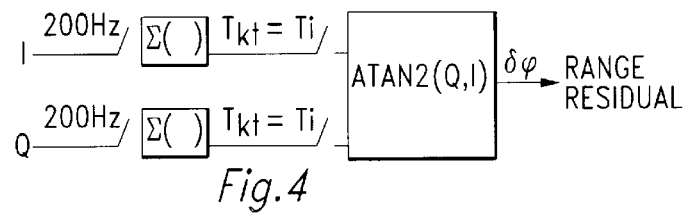
FIG. 4 is a block diagram representing the algorithm for the phase lock loop (PLL) range residual.

Referring now to FIG. 4, there is shown a block diagram representing the algorithm for the phase lock loop (PLL) range residual. The Kalman filter can separate the noise from the signal optimally as long as it is advised of the amount of noise present in the residual sent to the Kalman filter. The more noise present, the slower the filter operates. Here, a phase lock loop (PLL) is used to maintain all of the energy in the I channel and provide no energy in the Q (sine) channel or keep that signal at zero. A problem with the PLL is that $2\pi$ looks like $4\pi$ which looks like $6\pi$, etc. to provide an ambiguity. This residual provides local stability at increments of $2\pi$, but each $2\pi$ represents a 0.2 meter bias. Accordingly, the system is allowed to converge using the unbiased estimate (as described with reference to FIG. 2) and then, when the system converges, the mode of FIG. 4 is used. Convergence is determined by checking the Kalman filter covariance. In accordance with this algorithm, the I and Q signals from the SPC are received at a predetermined rate, this rate being shown as 200 Hz in the preferred embodiment. These signals are added up coherently over a designated time frame (Ti) for each of the I and Q signals individually to provide summations or integrals for each of the I and Q signals. The arctangents of the summed signals are taken to provide the output which is the input to the Kalman filter as a range residual.

The following is a description of an algorithm used herein in conjunction with the present invention which is to be used in conjunction with the drawings as described hereinabove.

The range and range rate aiding is utilized to form I and Q data which is mathematically modeled as the sines and cosines of the carrier phase error as follows:

$$I = D(t) \cdot DWO_{estimate}(t) \cdot R_{XX}(\tau_e) \cos(\Theta_e(t))$$

$$Q = D(t) \cdot DWO_{estimate}(t) \cdot R_{XX}(\tau_e) \sin(\Theta_e(t))$$

where D(t) is the 50 Hz rate, $R_{XX}$ is the PN autocorrelation triangle, $\tau_e$ is the range error in chips (1 chip=30 meters) and $\Theta_e$ is the range error in radians. The carrier phase error $\Theta_e(t)$ represents the range error in radians referenced to the carrier frequency (i.e., L1=1.54 GHz or 154 $f_o$, where f0=10.23 MHz). This range error is the error between the true range to a given satellite and the range estimated from navigation state variables (these include ECEF position and velocity as well as user time bias and bias rate variables).

The code phase mis-tuning $\tau_e$, in cycles @ f0, also represents the range error and has the effect of a correlation loss $R_{XX}$ on the signal. Note that $R_{XX}$ denotes the standard auto-correlation triangle for a PN code. In the case of the P-code used for GPS, this triangle spans (±) one pchip (cycle @ $f_o$ or about 30 meters). Not shown are frequency mis-tuning losses (sinx/x) and additive Gaussian noise for each I and Q data pair. Note also that D(t) modulates the carrier at a 50 Hz rate and is removed (or wiped off) with estimates of D(t) which are passed to this routine from a data demodulation function. Most of this modulated data is required to be known independent of signal processing benefits, since the data contains ephemeris information required for navigation purposes.

In order to estimate pseudo range and range rate residuals input to the navigation Kalman filter, the following calculations are made:

For the first residual, first the I and Q values are coherently integrated for a specified period of time which depends upon the range rate uncertainty (LOS covariance) calculated by the Kalman filter according to:

$$\bar{I} = \sum_{i=1}^{N} I_i$$

$$\bar{Q} = \sum_{i=1}^{N} Q_i$$

The bars over the I and Q data indicate that they are average orthogonal components of a phasor. The argument for each component represents, with good approximation, the average phase error evaluated at the midpoint of each coherent integration dwell.

Using the above coherently derived I and Q values, three different residuals are formed to drive the eighteen state extended Kalman filter. FIG. 1 illustrates the high level structure for each of these residuals, which are produced as integrate and dump (I & D) residuals to the Kalman filter. The three residual types are described as follows:

By coherently integrating I and Q values for both early and late P-code state setups, the unbiased pseudo-range residual is formed as follows from coherent samples according to FIG. 2:

$$E = \left[ \left( \sum_{i=1}^{k} ((\overline{I_E})^2 + (\overline{Q_E})^2)_i \right) \right]^{1/2}$$

$$L = \left[ \left( \sum_{i=1}^{k} ((\overline{I_L})^2 + (\overline{Q_L})^2)_i \right) \right]^{1/2}$$

The range residual is then formed as:

$$\delta R = \tau_e = G \cdot \frac{E - L}{E + L}$$

G is a gain factor derived from C/NO estimates to compensate for gain depression effects. This gain factor is contained in a lookup table and is a function of C/NO.

The residual $\delta R$, scaled to meters, then drives the extended Kalman filter every $t_k$ seconds. This residual is an unbiased range error measurement from which the navigation ECEF position and clock states are directly observable. This residual makes use of global properties of p-code that produces zero prompt channel correlation loss when (and only when) the pseudo-range residual is zero ($R_{XX}(0)+1$) or, alternatively, when E=L. Using this present invention, the Kalman filter has taken the place of traditional tracking loop filters in order to close a delay lock loop. The action of this closed loop system is to estimate navigation states that directly drive the pseudo-range residual to zero.

The second residual estimated to directly drive the Kalman filter is an unbiased estimate of pseudo range rate. This residual has as inputs coherently generated I and Q data sampled from the prompt code correlator. The pseudo range rate residual is calculated as follows as shown in FIG. 3:

$$\delta \dot{R} = d\overline{\theta_e}/dt = \text{ATan2}(cross, dot)/dt$$

$$cross = \sum_{i=1}^{K} (\overline{I_n}\,\overline{Q_{n-1}} - \overline{Q_n}\,\overline{I_{n-1}})_i$$

$$dot = \sum_{i=1}^{K} (\overline{I_n}\,\overline{I_{n-1}} - \overline{Q_n}\,\overline{Q_{n-1}})_i$$

where I and Q data are coherently averaged over adjacent time steps (n and n−1), separated in time by dt. This residual is then scaled from units of radians @ L1 to m/s and then directly input to the Kalman filter. What has happened in this case is that the Kalman filter has been used in the place of traditional tracking loop filters in order to close a frequency lock loop. This measurement directly couples to the velocity and time bias rate state variables of the Kalman filter.

The third residual for direct use into the Kalman filter is treated as a range residual and provides a locally stable but biased range residual (by modulo $2\pi$ or 15 0.195 meters @ L1). This residual is calculated as follows as shown in FIG. 4:

$$(a.) \; \delta R = \Theta_e(t_{mid}) = \sum_{i=1}^{K} (\text{ARCTAN2}(\overline{Q}, \overline{I}))_i$$

$$(b.) \; \delta R = \Theta_e(t_{mid}) = \sum_{i=1}^{K} (\text{ARCTAN}(\overline{Q}/\overline{I}))_i$$

In case (a.), the arctan2 function is used when DWO is in use. When DWO is not in use, then the two quadrant (arctan (y,x)) in case (b.) supra is used. The choice is application specific.

The third residual represents the pseudo-range error (modulo $2\pi$) with units of radians @ the L1 carrier frequency. In contrast, the first residual described above is an unbiased estimate of pseudo range to each satellite but @ f0. When both residuals are scaled to meters, the biased estimate in the third residual is inherently 154 times more accurate than the first residual. This inherent accuracy difference produces carrier measurements into the Kalman filter with measurement noise on the order of 10 to 20 mm (one sigma) at C/NO values in the neighborhood of 2 dB-Hz. These measurements produce the most accurate INS alignment at low C/NO values (approaching 2 dB-Hz) by coupling to high derivative states through the Kalman filter dynamics equations. What has happened in this case is that the Kalman filter has been used in place of traditional tracking loop filters in order to close a phase lock loop.

In order to minimize the navigation position bias for this estimate, the system first converges using the first two residuals. Using Kalman filter error covariance estimates as indicators of system convergence, the third range residual is then used for ultimate INS alignment accuracy at very low C/NO values. The second range rate residual may be used simultaneously with the first and third residuals. It should be noted that, for all three residuals, the Kalman filter is iterated every K*N*dt seconds. Due to throughput limitations, non-coherent integration in the third residual may be particularly useful when applying this method at high C/NO conditions (option (b.) above).

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A system for increasing jamming immunity in a GPS/INS system, comprising:
    (a) a signal processor for receiving and down-converting GPS signals to a baseband frequency to provide I and Q (sine and cosine) signals;
    (b) means to perform an integrate and dump operation on said I and Q signals to provide GPS range and range rate residuals which are uncorrelated from sample to sample;
    (c) a Kalman filter for estimating navigation state corrections from said GPS range and range rate residuals;
    (d) navigation means responsive to the output of said Kalman filter and range error and velocity error signals to provide guidance information and signals for correcting at least one of earth centered earth fixed (ECEF) position, velocity, initial attitude and Inertial measurement unit alignment states which are dynamically calculated from range and range rate measurements; and
    (e) line of sight means for mapping position and velocity vector information from said navigation means into geometric range and range rate scalar information and feeding said scalar information to said signal processor and to said means to perform an integrate and dump operation;
    wherein said means to integrate and dump includes coherently adding the I signals and the Q signals separately over a predetermined time period (Ti) to provide a summation for each of the I and Q signals over the time period Ti, forming from these summations cross and dot products at the Ti rate, summing the cross and dot products over a different time interval of length Tk to provide a pair of second summations, one for the cross product signal and one for the dot product signal, and taking an arctangent function of the summed cross products and dot products and dividing the arctangent function by the integration time (Ti) to obtain said residual directly.

2. The system of claim 1, wherein said signal processor includes a plurality of GPS channels to enable tracking of a plurality of satellites simultaneously.

3. The system of claim 1, further including, responsive to said range residual reaching a predetermined value, substituting for said means to integrate and dump means for receiving the I and Q signals from the signal processor at a predetermined rate, an adder for separately coherently adding said I and Q signals over a designated time frame (Ti) for each of the I and Q signals individually to provide summations for each of the I and Q signals and means to take the arctangents of the summed signals to provide the output which is the input to the Kalman filter as a range residual.

4. The system of claim 3, wherein said signal processor includes a plurality of GPS channels to enable tracking of a plurality of satellites simultaneously.

5. The system of claim 1, wherein said signal processor is operable to use collected data from demodulated GPS signals to perform a data wipe off cancellation operation on the down-converted GPS signals, the I and Q signals being based on the results of the cancellation operation.

6. A system for increasing jamming immunity in a GPS/INS system, comprising:
    (a) a signal processor for receiving and down-converting GPS signals to a baseband frequency to provide I and Q (sine and cosine) signals;
    (b) means to perform an integrate and dump operation on said I and Q signals to provide GPS range and range rate residuals which are uncorrelated from sample to sample;
    (c) a Kalman filter for estimating navigation state corrections from said GPS range and range rate residuals;
    (d) navigation means responsive to the output of said Kalman filter and range error and velocity error signals to provide guidance information and signals for correcting at least one of earth centered earth fixed (ECEF) position, velocity, initial attitude and Inertial measurement unit alignment states which are dynamically calculated from range and range rate measurements; and
    (e) line of sight means for mapping position and velocity vector information from said navigation means into geometric range and range rate scalar information and feeding said scalar information to said signal processor and to said means to perform an integrate and dump operation;
    wherein said means to integrate and dump includes an adder for coherently adding the I signals and the Q signals separately over a predetermined time period (Ti) to provide a summation for each of the I and Q signals over the time period Ti for each of an early channel and a late channel, squaring circuitry for squaring the received I and Q signals in each of the early channel and late channel to provide an envelope detect, a summer for summing the squared signals separately in each of the early channel and late channel for the time period Ti, an envelope detection circuit providing envelope detection for each channel prior to computation of the range residual, said envelope detection being circuitry to provide the difference between the early channel and late channel divided by the sum of the early channel and late channel.

7. The system of claim 6, further including, responsive to said range residual reaching a predetermined value, substituting for said means to integrate and dump means for receiving the I and Q signals from the signal processor at a predetermined rate, an adder for separately coherently adding said I and Q signals over a designated time frame (Ti) for each of the I and Q signals individually to provide summations for each of the I and Q signals and means to take the arctangents of the summed signals to provide the output which is the input to the Kalman filter as a range residual.

8. The system of claim 7, wherein said signal processor includes a plurality of GPS channels to enable tracking of a plurality of satellites simultaneously.

9. The system of claim 6, wherein said signal processor includes a plurality of GPS channels to enable tracking of a plurality of satellites simultaneously.

10. The system of claim 6, wherein said signal processor is operable to use collected data from demodulated GPS signals to perform a data wipe off cancellation operation on the down-converted GPS signals, the I and Q signals being based on the results of the cancellation operation.

11. A method for increasing jamming immunity in a GPS/INS system, comprising the steps of:
(a) receiving and down-converting GPS signals to a baseband frequency to provide I and Q (sine and cosine) signals;
(b) performing an integrate and dump operation on said I and Q signals to provide residuals which are uncorrelated from sample to sample;
(c) performing a Kalman filtering function for estimating navigation state corrections from said GPS range and range rate residuals;
(d) responsive to the output of said Kalman filter and range error and velocity error signals, providing a navigation function to provide guidance information and signals for correcting at least one of earth centered earth fixed (ECEF) position, velocity, initial attitude and Inertial measurement unit alignment states which are dynamically calculated from range and range rate measurements; and
(e) mapping position and velocity vector information from said navigation function into geometric range and range rate scalar information and feeding said scalar information to said signal processor and to said means to perform an integrate and dump operation;
wherein said integrate and dump operation includes coherently adding the I signals and the Q signals separately over a predetermined time period (Ti) to provide a summation for each of the I and Q signals over the time period Ti, forming from these summations cross and dot products at the Ti rate, summing the cross and dot products over a different time interval of length Tk to provide a pair of second summations, one for the cross product signal and one for the dot product signal and taking an arctangent function of the summed cross products and dot products and dividing the arctangent function by the integration time (Ti) to obtain said residual directly.

12. The method of claim 11, wherein said signal processor is provided with a plurality of GPS channels to enable tracking of a plurality of satellites simultaneously.

13. The method of claim 11, further including, responsive to said range residual reaching a predetermined value, substituting for said integrate and dump operation receiving the I and Q signals from the signal processor at a predetermined rate, separately coherently adding said I and Q signals over a designated time frame (Ti) for each of the I and Q signals individually to provide summations for each of the I and Q signals and taking the arctangents of the summed signals to provide the output which is the input to the Kalman filter as a range residual.

14. The method of claim 13, wherein said signal processor is provided with a plurality of GPS channels to enable tracking of a plurality of satellites simultaneously.

15. The method of claim 11, including the step of using collected data from demodulated GPS signals to perform a data wipe off cancellation operation on the down-converted GPS signals, the I and Q signals being based on the results of the cancellation operation.

16. A method for increasing jamming immunity in a GPS/INS system, comprising the steps of:
(a) receiving and down-converting GPS signals to a baseband frequency to provide I and Q (sine and cosine) signals;
(b) performing an integrate and dump operation on said I and Q signals to provide residuals which are uncorrelated from sample to sample;
(c) performing a Kalman filtering function for estimating navigation state corrections from said GPS range and range rate residuals;
(d) responsive to the output of said Kalman filter and range error and velocity error signals, providing a navigation function to provide guidance information and signals for correcting at least one of earth centered earth fixed (ECEF) position, velocity, initial attitude and Inertial measurement unit alignment states which are dynamically calculated from range and range rate measurements; and
(e) mapping position and velocity vector information from said navigation function into geometric range and range rate scalar information and feeding said scalar information to said signal processor and to said means to perform an integrate and dump operation;
wherein said integrate and dump operation includes coherently adding the I signals and the Q signals separately over a predetermined time period (Ti) to provide a summation for each of the I and Q signals over the time period Ti for each of an early channel and a late channel, squaring the received I and Q signals in each of the early channel and late channel to provide an envelope detect, summing the squared signals separately in each of the early channel and late channel for the time period Ti, providing envelope detection for each channel prior to computation of the range residual, said envelope detection being the difference between the early channel and late channel divided by the sum of the early channel and late channel.

17. The method of claim 16, further including, responsive to said range residual reaching a predetermined value, substituting for said integrate and dump operation receiving the I and Q signals from the signal processor at a predetermined rate, separately coherently adding said I and Q signals over a designated time frame (Ti) for each of the I and Q signals individually to provide summations for each of the I and Q signals and taking the arctangents of the summed signals to provide the output which is the input to the Kalman filter as a range residual.

18. The method of claim 17, wherein said signal processor is provided with a plurality of GPS channels to enable tracking of a plurality of satellites simultaneously.

19. The method of claim 16, wherein said signal processor is provided with a plurality of GPS channels to enable tracking of a plurality of satellites simultaneously.

20. The method of claim 16, including the step of using collected data from demodulated GPS signals to perform a data wipe off cancellation operation on the down-converted GPS signals, the I and Q signals being based on the results of the cancellation operation.

21. A GPS system having a high immunity to jamming, comprising:
- a processing circuit which is operable to receive and down-convert GPS signals to provide sine and cosine information;
- a residual generation circuit which is operable to generate GPS residual information in response to said sine and cosine information;
- a filter circuit which directly filters said residual information to generate correction information;
- a further circuit which is responsive to said correction information for correcting operational information which includes at least one of position, velocity, attitude and alignment information; and
- a circuit which supplies feedback information derived from said operational information to at least one of said processing circuit and said residual generation circuit.

22. A system according to claim 21, wherein said filter circuit includes a Kalman filter.

23. A system according to claim 21, wherein said residual information includes at least one of phase locked loop range residual information and early/late range residual information.

24. A system according to claim 23, wherein said residual information includes range rate residual information.

25. A system according to claim 21, wherein said GPS residual information is a first type of residual information under a first operating condition, and is a second type of residual information different from said first type under a separate operating condition different from said first operating condition.

26. A system according to claim 21, wherein said residual generation circuit includes an integrate and dump circuit.

27. A system according to claim 21, further including an inertial measurement unit operable to produce an output, and wherein said further circuit is a navigation circuit operable to maintain said operational information using said correction information and said output of said inertial measurement unit.

28. A system according to claim 21, wherein said processing circuit is operable to use collected data from demodulated GPS signals to perform a data wipe off cancellation operation on the down-converted GPS signals, the sine and cosine information being based on the results of the cancellation operation.

29. A method for increasing jamming immunity in a GPS system, comprising the steps of:
- receiving and down-converting GPS signals to provide sine and cosine information;
- generating GPS residual information in response to said sine and cosine information;
- generating correction information by directly filtering said residual information;
- correcting operational information in response to said correction information, said operational information including at least one of position, velocity, attitude and alignment information; and
- using feedback information derived from said operational information to carry out at least one of said steps of receiving and generating GPS residual information.

30. A method according to claim 29, wherein said filtering of said residual information is carried out using a Kalman filter.

31. A method according to claim 29, including the step of using as said residual information at least one of phase locked looped range residual information and early/late range residual information.

32. A method according to claim 31, including the step of using as said residual information range rate residual information.

33. A method according to claim 29, wherein said residual information is a first type of residual information under a first operating condition, and is a second type of residual information different from said first type under a second operating condition different from said first operating condition.

34. A method according to claim 29, wherein said step of generating residual information includes the step of carrying out an integrate and dump operation on said sine and cosine information.

35. A method according to claim 29, including the steps of providing an inertial measurement unit which is operable to produce an output, and maintaining said operational information using said output of said inertial measurement unit and said correction information.

36. A method according to claim 29, including the step of using collected data from demodulated GPS signals to perform a data wipe off cancellation operation on the down-converted GPS signals, the sine and cosine signals being based on the results of the cancellation operation.

* * * * *